L. HANSEN.
CHAIN DRIVE WITH REVERSE.
APPLICATION FILED MAY 8, 1913.
1,115,815.
Patented Nov. 3, 1914.
2 SHEETS—SHEET 1.
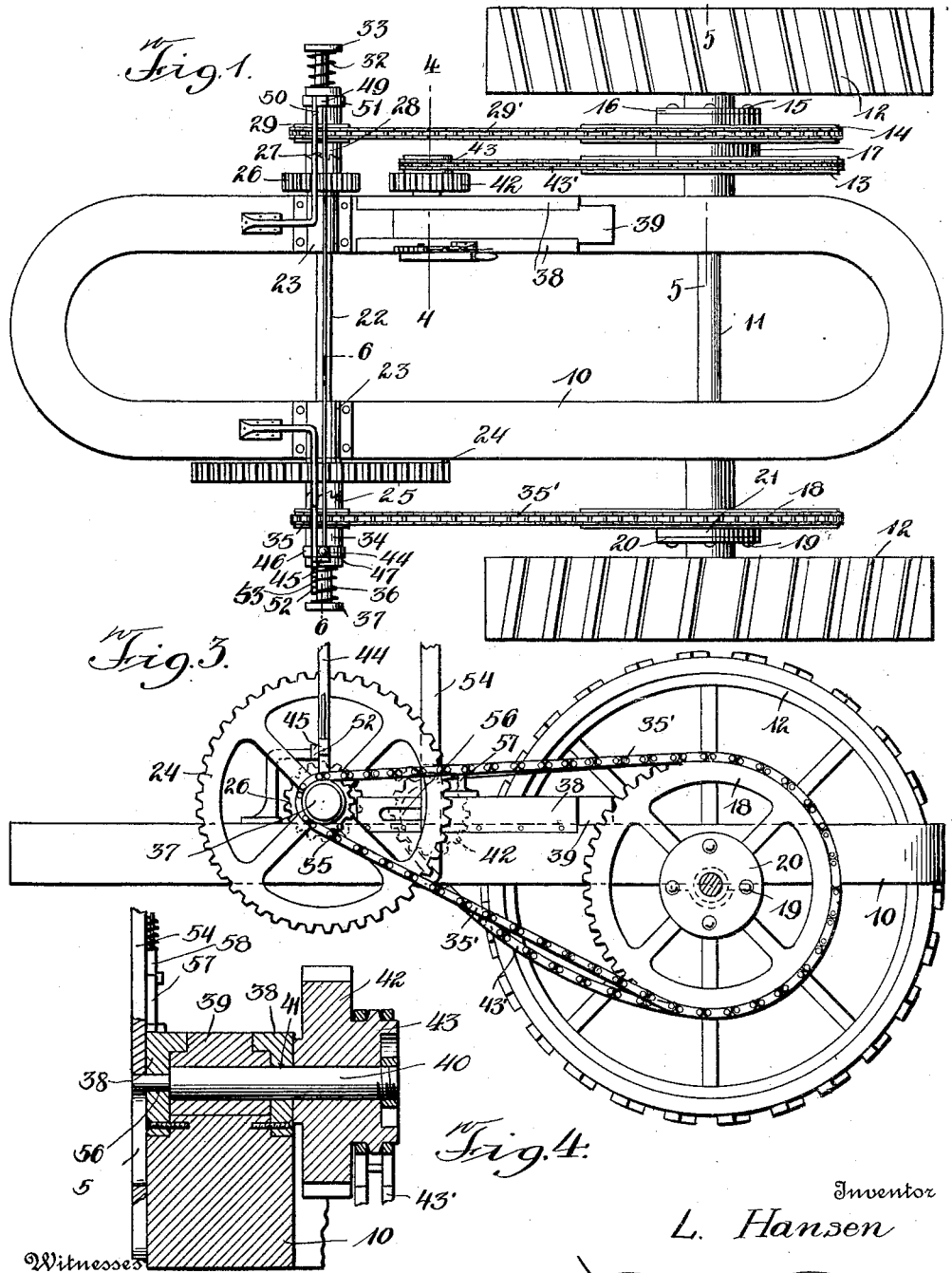
Inventor
L. Hansen L. HANSEN.
CHAIN DRIVE WITH REVERSE.
APPLICATION FILED MAY 8, 1913.
1,115,815.
Patented Nov. 3, 1914.
2 SHEETS—SHEET 2.
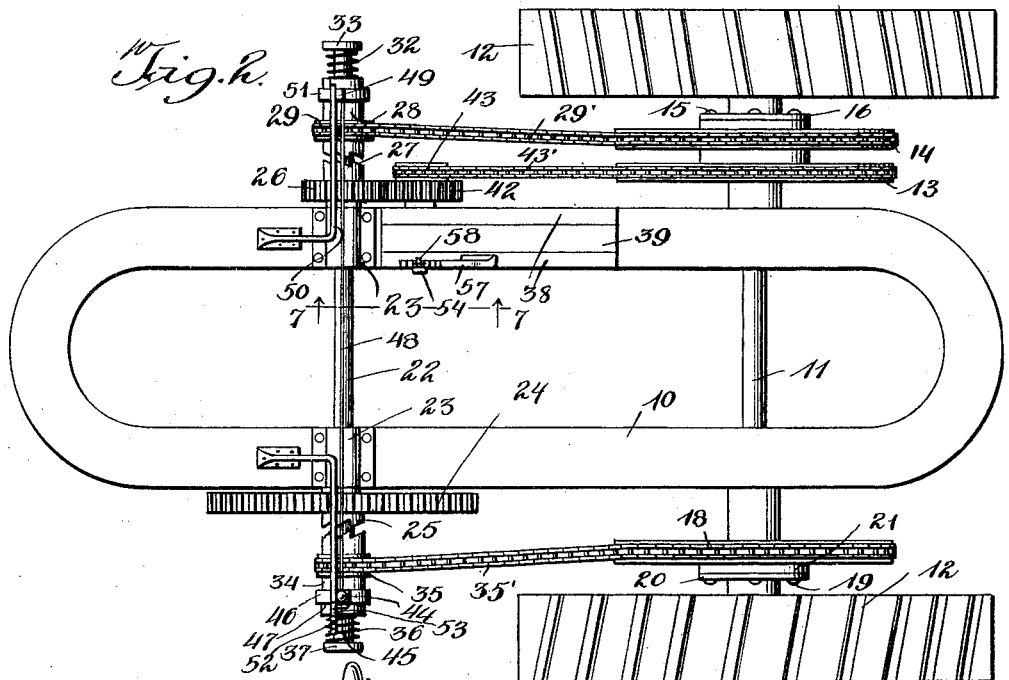
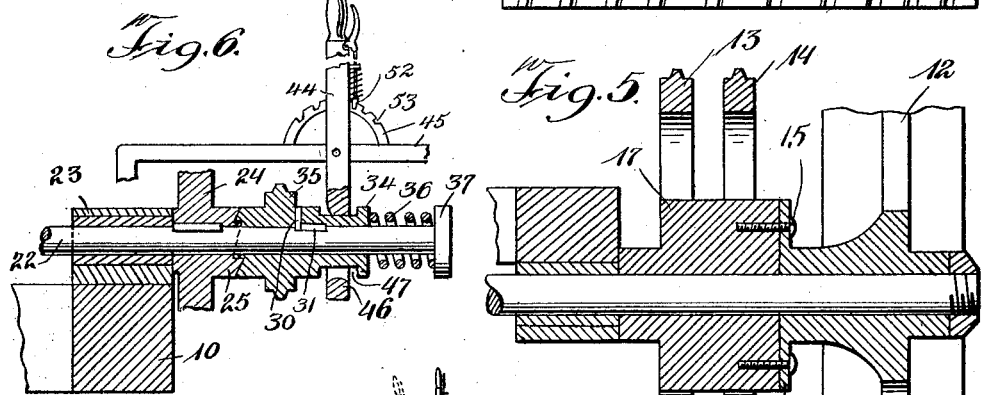
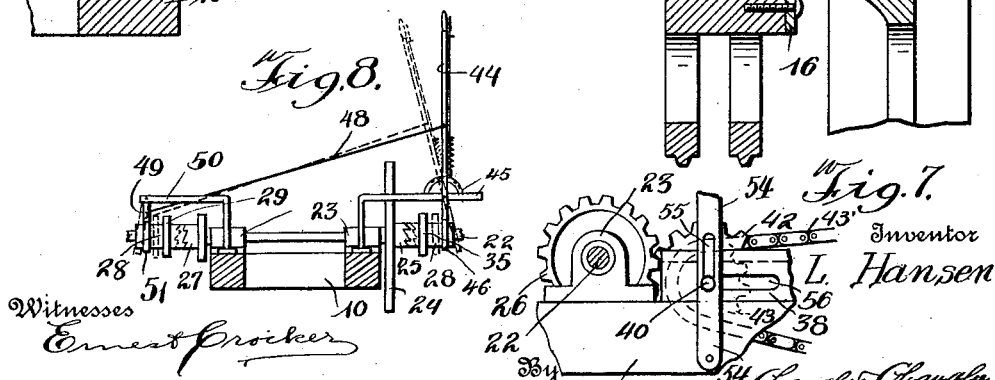
Witnesses
Ernest Crocker
Francis Boyle
Inventor
L. Hansen
By Chandler & Chandler
Attorney

UNITED STATES PATENT OFFICE.

LUDVIG HANSEN, OF FERTILE, MINNESOTA.

CHAIN DRIVE WITH REVERSE.

1,115,815.  Specification of Letters Patent.  Patented Nov. 3, 1914.

Application filed May 8, 1913. Serial No. 766,419.

*To all whom it may concern:*

Be it known that I, LUDVIG HANSEN, a citizen of the United States, residing at Fertile, in the county of Polk, State of Minnesota, have invented certain new and useful Improvements in Chain Drives with Reverse; and I do hereby declare the following to be a full, clear, and exact description of the invention, such as will enable others skilled in the art to which it appertains to make and use the same.

This invention relates to chain drives for traction engines and the like and has for an object to provide an extremely simple forward and reverse drive that is constructed of a few parts that will not easily get out of order.

With the above object in view the invention consists of certain novel details of construction and combination of parts hereinafter fully described and claimed, it being understood that various modifications may be made in the minor details of construction within the scope of the appended claim.

In the accompanying drawings illustrating this invention:—Figure 1 is a plan view of the invention with the drive mechanism in "forward" position. Fig. 2 is a plan view showing the drive mechanism in "reverse" position. Fig. 3 is a side elevation of the part shown in Fig. 1 with the near traction wheel removed. Fig. 4 is an enlarged cross sectional view on the line 4—4 Fig. 1. Fig. 5 is an enlarged cross sectional view on the line 5—5 Fig. 1. Fig. 6 is an enlarged cross sectional view on the line 6—6 Fig. 1. Fig. 7 is a fragmentary longitudinal sectional view on the line 7—7 Fig. 2. Fig. 8 is a reduced cross sectional view showing the clutches in operative position and dotted in released position.

Referring now to the drawings in which like characters of reference designate similar parts, 10 designates a main frame, 11 a rear axle and 12 traction wheels loose on the ends of the axle. A pair of drive sprocket gears 13 and 14 are secured to one traction wheel by means of bolts 15 passed through a flange 16 on the traction wheel hub and into the common hub 17 of the gears, or the gears may be otherwise attached fixedly to the traction wheels. A drive gear 18 is attached to the other drive wheel by means of bolts 19 passed through the hub flange 20 of the traction wheel and into the hub 21 of the gear, or otherwise.

A driving shaft 22 is journaled transversely on the main frame by means of bearings 23 the shaft being equipped near one end outside of the main frame with a fixed driving gear 24 the hub of which is formed with a clutch face 25, and is equipped near the opposite end outside of the main frame with a fixed driven gear 26 the hub of which is formed with a clutch face 27.

On one outer end of the driving shaft is disposed a sliding clutch 28 having an integral sprocket gear 29 over which and the outer sprocket gear 14 of the adjacent traction wheel a sprocket chain 29′ is trained. The clutch is limited in sliding movement by a pin 30 passed therethrough into a slot 31 in the driving shaft, and is normally held in engagement with the ratchet face 27 of the gear 26 by means of a helical spring 32 that is confined under tension between an abutment collar 33 on the adjacent outer end of the shaft and outer end of the clutch, as best shown in Fig. 6. Likewise, upon the opposite outer end of the driving shaft is disposed a sliding clutch 34 that is equipped with an integral sprocket gear 35 over which and the sprocket gear 18 of the adjacent traction wheel a sprocket chain 35′ is trained. This clutch is held in engagement with the ratchet face 25 of the driving gear 24 by means of a helical spring 36 that is confined under tension between an abutment collar 37 on the adjacent outer end of the shaft and outer end of the clutch.

In the above described operative positions of the clutches, rotary movement is transmitted in a forward direction from the driving shaft 22 through the drive chains 29′ and 35′ to the traction wheels with a resultant advance of the traction vehicle. For reversing or "backing" the vehicle the clutches are disengaged and the following mechanism employed: A pair of angular guide bars 38 are disposed on the main frame 10 and slidably fitted between these bars is a slide block 39 which carries a laterally projecting shaft 40 that extends through a slot 41 in the outer guide bar and is terminally equipped with a fixed gear 42 adapted to mesh with the driven gear 26 when the block is slid forwardly, this gear 42 having an integral sprocket gear 43 over which and the inner sprocket gear 13 of the adjacent traction wheel a sprocket chain 43′ is trained. Upon engagement of the gear 42 with the driving gear 26, the gear 26 rotates the gear 42 rearwardly with a resultant retrograde actuation of the chain drive 43' and resultant "backing" of the vehicle.

Any suitable mechanism may be employed for releasing the clutches such as for instance a lever 44 pivoted on a bracket 45 secured to the main frame and having a strap 46 that engages in a groove 47 in the clutch 34, a link 48 being connected to a lever 49 that is pivoted on a bracket 50 secured to the main frame and that is equipped with a strap 51 that engages the clutch 28. Upon the lever being shoved inwardly both clutches are moved outwardly against the tension of their controlling springs into released position, and may be locked in this position by means of a spring controlled pawl 52 that engages in a notch 53 on the bracket 45.

Any suitable mechanism may be employed for operating the slide block 39 to engage and disengage the gears 26 and 42, as for instance a lever 54 pivoted at the lower end to the main frame and having a slot 55 receiving the inner end of the shaft 40 which inner end projects through a slot 56 in the inner guide bar of the guide block, there being a notched segment 57 on said guide bar in which a spring pressed pawl 58 carried by the lever engages.

What is claimed, is:—

In a forward and reverse transmission for traction vehicles, the combination of a wheel, a pair of sprocket gears assembled with and actuating said wheel, a driving shaft, a gear on and driven by said shaft and having a clutch face, a clutch on said shaft normally engaging said face, a sprocket gear carried by said clutch, a sprocket chain trained over said sprocket gear and one of said pair of sprocket gears, means for releasing said clutch, a reversing gear adapted to be slid into engagement with said driven gear after release of said clutch, a sprocket gear integral with said reversing gear, and a sprocket chain trained over the last named sprocket gear and the other of said pair of sprocket gears.

In testimony whereof, I affix my signature, in the presence of two witnesses.

LUDVIG HANSEN.

Witnesses:
HERBERT LARSON,
HANS PAULSRUD.

---

Copies of this patent may be obtained for five cents each, by addressing the "Commissioner of Patents, Washington, D. C."